(12) United States Patent
Pandey et al.

(10) Patent No.: US 10,586,188 B2
(45) Date of Patent: Mar. 10, 2020

(54) METHOD AND SYSTEM FOR DYNAMIC RECOMMENDATION OF EXPERTS FOR RESOLVING QUERIES

(71) Applicant: Wipro Limited, Bangalore (IN)

(72) Inventors: Garima Pandey, Bengaluru (IN); Vinay Narayana, Bangalore (IN); RamPrasad Kanakatte Ramanna, Bangalore (IN)

(73) Assignee: Wipro Limited, Bangalore (IN)

( * ) Notice: Subject to any disclaimer, the term of this patent is extended or adjusted under 35 U.S.C. 154(b) by 409 days.

(21) Appl. No.: 15/389,717

(22) Filed: Dec. 23, 2016

(65) Prior Publication Data

US 2018/0129673 A1   May 10, 2018

(30) Foreign Application Priority Data

Nov. 8, 2016 (IN) .............................. 201641038191

(51) Int. Cl.
*G06Q 10/06* (2012.01)

(52) U.S. Cl.
CPC .......................... *G06Q 10/063112* (2013.01)

(58) Field of Classification Search
CPC .............................................. G06Q 10/063112
See application file for complete search history.

(56) References Cited

U.S. PATENT DOCUMENTS

| | | | |
|---|---|---|---|
| 6,223,165 B1 * | 4/2001 | Lauffer | G06Q 10/0631 705/7.13 |
| 8,332,231 B2 | 12/2012 | Cloran | |
| 8,521,675 B2 | 8/2013 | Boyle et al. | |
| 2007/0260587 A1 * | 11/2007 | Mohan | G06Q 10/06 |
| 2009/0245500 A1 | 10/2009 | Wampler | |
| 2015/0215463 A1 | 7/2015 | Shaffer et al. | |
| 2017/0140474 A1 * | 5/2017 | Tran | G06Q 50/01 |

FOREIGN PATENT DOCUMENTS

WO    02/072221 A2    9/2002

OTHER PUBLICATIONS

Birukou et al., Implicit: A Multi-Agent Recommendation System for Web Search, Auton Agent Multi-Agent Syst. (2012) 24:141-174.
(Continued)

*Primary Examiner* — Albert M Phillips, III
(74) *Attorney, Agent, or Firm* — Pepper Hamilton LLP

(57) ABSTRACT

Disclosed herein is a method and a system for dynamic recommendation of experts for resolving queries. The method comprises generating expert scores for each expert connected to the system. A ranked order list of all the experts is generated based on the expert scores and availability of the experts. Further, an expert having the highest expert score in the ranked order list is recommended for resolving the user queries by establishing a communication session between user and the recommended expert. The expert score for the recommended expert is updated in real-time based on information collected from the communication session. The disclosed method helps in reducing total number of service tickets being generated for resolving a set of user queries, thereby reducing total waiting period and the resolution period.

9 Claims, 9 Drawing Sheets

(56) References Cited

OTHER PUBLICATIONS

Papagelis et al., Qualitative Analysis of User-Based and Item-Based Prediction Algorithms for Recommendation Agents, Institute of Computer Science, Foundation for Research and Technology, Heraklion, Greece.

Vignollet et al., Regulation Mechanisms in an Open Social Media Using a Contact Recommender System, University of Savoie, France, France Telecom R&D, France.

* cited by examiner

| ↓ Domain category Experts → | E1 | E2 | E3 | E4 | E5 | Total number of tickets |
|---|---|---|---|---|---|---|
| C1 | 10 | 6 | 5 | 6 | 1 | 28 |
| C2 | 3 | 1 | 3 | 7 | 7 | 21 |
| C3 | 6 | 9 | 7 | 9 | 9 | 40 |
| C4 | 8 | 11 | 12 | 1 | 5 | 37 |

FIGURE 6A

| ↓ Domain category Experts → | E1 | E2 | E3 | E4 | E5 |
|---|---|---|---|---|---|
| C1 | 2.4 | 3.5 | 3 | 3.5 | 1 |
| C2 | 2 | 4.7 | 3 | 2.5 | 3 |
| C3 | 3 | 1 | 2.5 | 1 | 2.5 |
| C4 | 1 | 3.6 | 1.5 | 4 | 2 |

FIGURE 6B

| ↓ Domain category Experts → | E1 | E2 | E3 | E4 | E5 |
|---|---|---|---|---|---|
| C1 | 3 | 2 | 4 | 3.2 | 1 |
| C2 | 4.5 | 1 | 3.1 | 4.1 | 4.2 |
| C3 | 2 | 1.7 | 4.3 | 2.3 | 3.1 |
| C4 | 3.5 | 4 | 2.2 | 1.8 | 2.2 |

FIGURE 6C

| Expert | Number of years of experience |
|---|---|
| E1 | 2.3 |
| E2 | 4 |
| E3 | 1.7 |
| E4 | 4 |
| E5 | 3.8 |

FIGURE 6D

| ↓ Domain category Experts → | E1 | E2 | E3 | E4 | E5 |
|---|---|---|---|---|---|
| C1 | 3.333333 | 3 | 1.25 | 1.875 | 1 |
| C2 | 0.666667 | 1 | 0.967742 | 1.707317 | 1.666667 |
| C3 | 3 | 5.294118 | 1.627907 | 3.913043 | 2.903226 |
| C4 | 2.285714 | 2.75 | 5.454545 | 0.555556 | 2.272727 |

FIGURE 6E

| ↓ Domain category Experts → | E1 | E2 | E3 | E4 | E5 |
|---|---|---|---|---|---|
| C1 | 0.48 | 0.7 | 0.6 | 0.7 | 0.2 |
| C2 | 0.4 | 0.2 | 0.6 | 0.5 | 0.6 |
| C3 | 0.6 | 0.2 | 0.5 | 0.2 | 0.5 |
| C4 | 0.2 | 0.72 | 0.3 | 0.8 | 0.4 |
| Average | 0.42 | 0.455 | 0.5 | 0.55 | 0.425 |

FIGURE 6F

| ↓ Domain category Experts → | E1 | E2 | E3 | E4 | E5 |
|---|---|---|---|---|---|
| C1 | 3 | 2 | 4 | 3.2 | 1 |
| C2 | 4.5 | 1 | 3.1 | 4.1 | 4.2 |
| C3 | 2 | 1.7 | 4.3 | 2.3 | 3.1 |
| C4 | 3.5 | 4 | 2.2 | 1.8 | 2.2 |
| ART per Expert | 13 | 8.7 | 13.6 | 11.4 | 10.5 |

FIGURE 6G

| ↓ Domain category Experts → | E1 | E2 | E3 | E4 | E5 |
|---|---|---|---|---|---|
| C1 | 6.95 | 3.15 | 2.20 | 1.96 | 0.05 |
| C2 | 0.34 | 0.05 | 1.02 | 1.49 | 1.84 |
| C3 | 4.69 | 2.38 | 3.35 | 1.76 | 3.43 |
| C4 | 1.59 | 5.44 | 11.55 | 0.11 | 1.19 |

FIGURE 6H

METHOD AND SYSTEM FOR DYNAMIC RECOMMENDATION OF EXPERTS FOR RESOLVING QUERIES

This application claims the benefit of Indian Patent Application Serial No. 201641038191 filed Nov. 8, 2016 which is hereby incorporated by reference in its entirety.

TECHNICAL FIELD

The present subject matter is related, in general to automated query handling, and more particularly, but not exclusively to a method and system for dynamic recommendation of experts for resolving queries.

BACKGROUND

The service industry covers a wide variety of activities such as trade, hotels and restaurants, transport, storage and communication, financing, insurance, real estate, business services, community, social and personal services, and services associated with construction. Presently, the quantum at which service requests are generated in various sectors of the service industry is increasing day by day. Handling of these service requests requires assistance from a large number of human professionals/experts. Hence, automated request-response systems that require limited number of human experts are being used in the service industry to cater to the needs of all the service customers.

The existing automated request-response systems make use of standard machine learning and text analysis concepts to handle the service request/user queries. Generally, the user queries can be of two types. The first type of queries comprises of frequently asked questions and known issues which have defined answers available in the automated request-response system. The second type of queries comprises of complicated logic or complex reasoning, for which the answers are not available in the system or which are difficult to comprehend by the system. Hence, such type of complex queries requires human experts to interact with the user for understanding, classifying and the for resolving the complex user queries.

The existing approaches of automated request-response systems, such as chat bot assistants, help in reducing the amount of service requests which are generic or of the first type. However, these systems are not suitable to handle the complex, domain specific service queries or queries of the second type, which can satisfy the service users. Hence, the systems switch to a human-agent mode by connecting user session to a human expert, for example when the automated chat bot or chat system is not able to handle the complicated queries of the user.

In a system where many such human experts are available with varied expertise to handle different type of queries, it is desirable and efficient to choose the human expert who is best suited to the type of query that the user is facing. Hence, there is a need for selection of human experts when dealing with type 2 service queries, thereby the system should be able to connect to the most appropriate human expert seamlessly in real-time.

The challenges mainly faced during dynamic recommendation of experts for resolving queries is to estimate the relative expertise of the available human experts to handle different categories of user queries in an automatic and real-time manner.

SUMMARY

Disclosed herein is a method for dynamic recommendation of experts for resolving queries. The method comprises identifying, by an expert recommendation system, a domain category of one or more queries received from a user. Upon identifying the domain category of the one or more queries, availability of one or more experts in the domain category of the one or more queries is identified. An expert score is generated for each of the one or more available experts based on one or more parameters comprising user ratings for the one or more available experts, time taken by the one or more available experts for resolving queries in the domain category previously, total number of queries resolved by the one or more experts in the domain category and prior experience of the one or more available experts, wherein the expert score for each of the one or more available experts is dynamically updated. Finally, one of the one or more available experts are recommended based on the expert score for resolving the one or more queries.

Further, the present disclosure discloses an expert recommendation system for dynamic recommendation of experts for resolving queries. The expert recommendation system comprises a processor and a memory communicatively coupled to the processor. The memory stores processor-executable instructions, which, on execution, causes the processor to identify a domain category of one or more queries received from a user. Upon identifying the domain category of the one or more queries, availability of one or more experts in the domain category of the one or more queries are identified. The processor further generates an expert score for each of the one or more available experts based on one or more parameters comprising user ratings for the one or more available experts, time taken by the one or more available experts to resolve queries in the domain category previously, total number of queries resolved by the one or more experts in the domain category and prior experience of the one or more available experts, wherein the expert score for each of the one or more available experts is dynamically updated. Finally, the processor recommends one of the one or more available experts based on the expert score for resolving the one or more queries.

Further the present disclosure comprises a non-transitory computer readable medium including instructions stored thereon that when processed by at least one processor causes an expert recommendation system to perform operations comprising identifying a domain category of one or more queries received from a user. The instructions further cause the processor to identify availability of one or more experts in the domain category of the one or more queries. Further, the instructions cause the processor to generate an expert score for each of the one or more available experts based on one or more parameters comprising user ratings for the one or more available experts, time taken by the one or more available experts for resolving queries in the domain category previously, total number of queries resolved by the one or more experts in the domain category and prior experience of the one or more available experts, wherein the expert score for each of the one or more available experts is dynamically updated.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

FIG. 6A illustrates the total number of tickets solved by each of the one or more domain categories by each of the experts E1-E5, in accordance with some embodiments of the present disclosure;

FIG. 6B illustrates user rating (UR) for experts for each domain category, in accordance with some embodiments of the present disclosure;

FIG. 6C illustrates Resolution Time (RT) for the experts in each domain category RT for the experts in each domain category, in accordance with some embodiments of the present disclosure;

FIG. 6D illustrates total number of years of experience of experts in the handling the one or more queries in the one or more domain categories, in accordance with some embodiments of the present disclosure;

FIG. 6E illustrates throughput of experts in each domain category, in accordance with some embodiments of the present disclosure;

FIG. 6F illustrates Average User Rating (AUR) for each expert in each domain category, in accordance with some embodiments of the present disclosure;

FIG. 6G illustrates Average Resolution Time (ART) for each expert in each domain category, in accordance with some embodiments of the present disclosure; and FIG. 6H illustrates expert score for each expert in each category, in accordance with some embodiments of the present disclosure.

Figure 1:
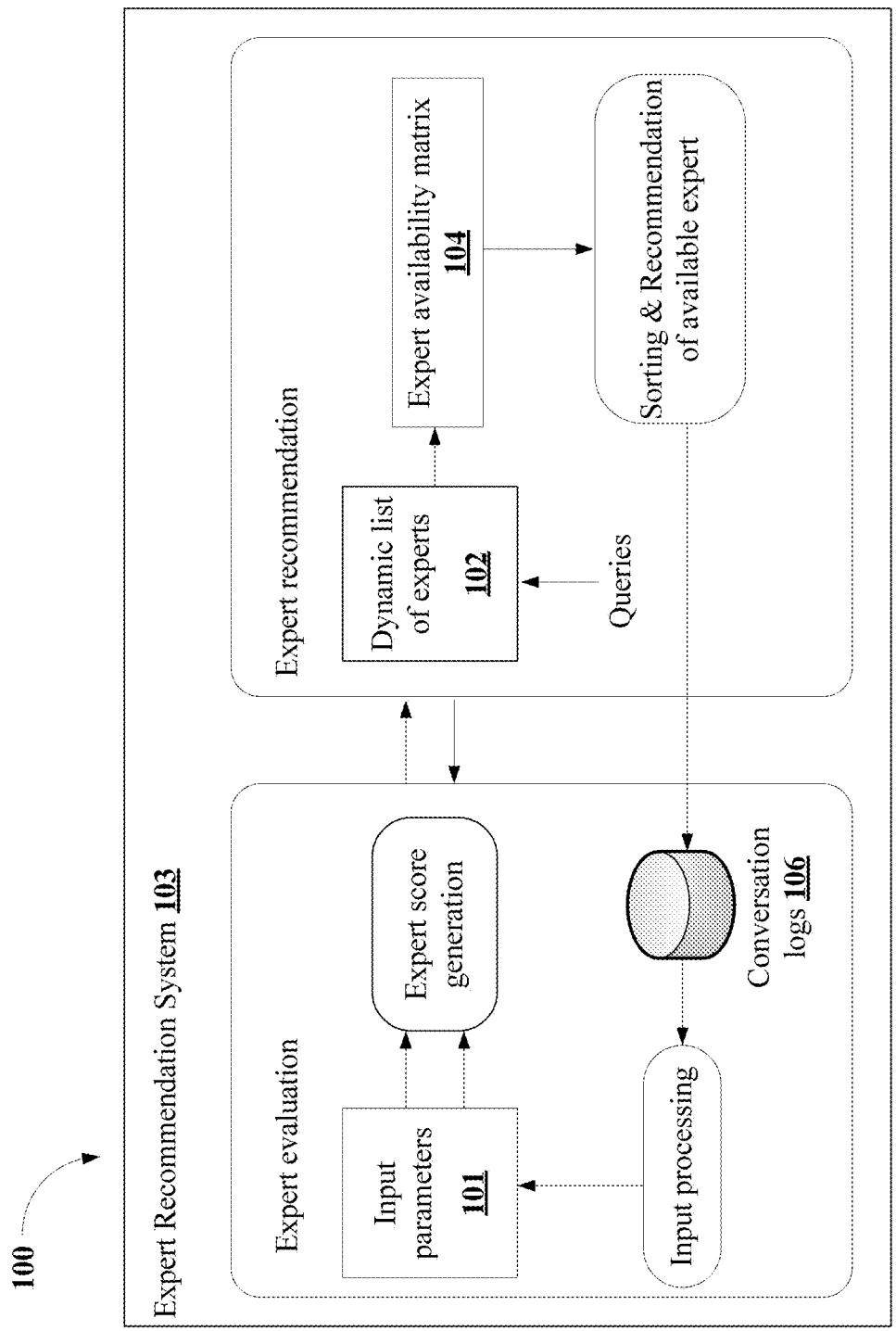
FIG. 1 shows an exemplary environment for dynamic recommendation of experts for resolving queries in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a method and an expert recommendation system for dynamic recommendation of experts for resolving queries. The expert recommendation system may be configured to select a most appropriate expert from a set of experts connected to the system based on availability of the experts to provide a seamless expert involvement in resolving the one or more user queries. The availability of the experts may be determined by analyzing the type of the user query and generating a ranked order list of all the available experts who are capable of solving the one or more user queries. Upon determining the availability of the one or more experts, the expert recommendation system initiates a communication session between the user and the expert for connecting the user directly to the highest ranked and available expert in real-time.

Further, the expert recommendation system may create a knowledge base for the recommended experts based on the conversation between the user and the expert during the communication session. In an embodiment, the knowledge base associated with the experts may be updated continuously for evaluating the human experts. The experts may be evaluated by calculating an expert score for each expert in a respective domain of the user query based on one or more parameters associated with the experts. Finally, a ranked order list of all the available experts is generated based on the expert score. As an example, the one or more parameters used in evaluation of the experts may comprise user ratings for the one or more available experts, time taken by the one or more available experts for resolving queries in the domain category previously, total number of queries resolved by the one or more experts in the domain category and prior experience of the one or more available experts.

In an embodiment, the method and the expert recommendation system of present disclosure helps in reducing total number of service tickets being generated for resolving the one or more queries received from the user. Also, expert recommendation system is capable of providing an immediate resolution for the one or more user queries by dynamically recommending the most appropriate expert, thereby reducing the total waiting time for the user.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows an exemplary environment for dynamic recommendation of experts for resolving queries in accordance with some embodiments of the present disclosure.

Accordingly, the environment 100 comprises an expert recommendation system 103 for dynamically recommending an expert for resolving user queries. The expert recommendation system 103 receives one or more queries from a user and identifies a domain category of each of the one or more queries for identifying a suitable expert for resolving the one or more queries. As an example, an expert who is capable of resolving the hardware related queries may be identified for resolving the one or more queries that belong to a hardware service domain. Further, the expert recommendation system 103 may identify availability of the one or more experts in the domain category of the one or more queries. Further, the expert recommendation system 103 generates an expert score 205 for each of the one or more available experts based on one or more parameters (indicated as input parameters 101 in FIG. 1) comprising user ratings for the one or more available experts, time taken by the one or more available experts for resolving queries in the domain category previously, total number of queries resolved by the one or more experts in the domain category and prior experience of the one or more available experts.

In some embodiment, the expert recommendation system 103 may generate a dynamic list of experts 102 based on the availability and the expert score 205 associated with each of the one or more experts. The availability status of each of the one or more experts may be identified and stored in an expert availability matrix 104. As an example, the availability matrix 104 may store a value '0' for an expert who is 'offline' or currently not available. Alternatively, the availability matrix 104 may store a value '1' for an expert who is 'online' and is available for handling the one or more queries. Further, the expert recommendation system 103 may recommend one of the one or more experts for resolving the one or more queries by sorting the dynamic list of experts 102 and identifying one of the available expert having highest expert score 205. In an embodiment, a communication session may be established between the user and the recommended expert for resolving the one or more queries. As an example, the communication session may be at least one of an audio and/or video enabled session or an e-mail/text message based chat session between the user and the recommended expert.

In some embodiment, the expert recommendation system 103 dynamically updates the expert score 205 associated with the recommended expert based on the updated values of the one or more input parameters 101. The values of the one or more input parameters 101 are updated upon completion of the communication session between the user and the recommended expert, using session related conversation logs 106 stored in the expert recommendation system 103. The conversation logs 106 related to a most recent communication session are extracted and processed to determine updated values of each of the one or more input parameters 101. Finally, a new expert score 205 for each of the one or more experts is generated based on the updated values of the one or more input parameters 101, each time when a communication session is completed.

Figure 2:
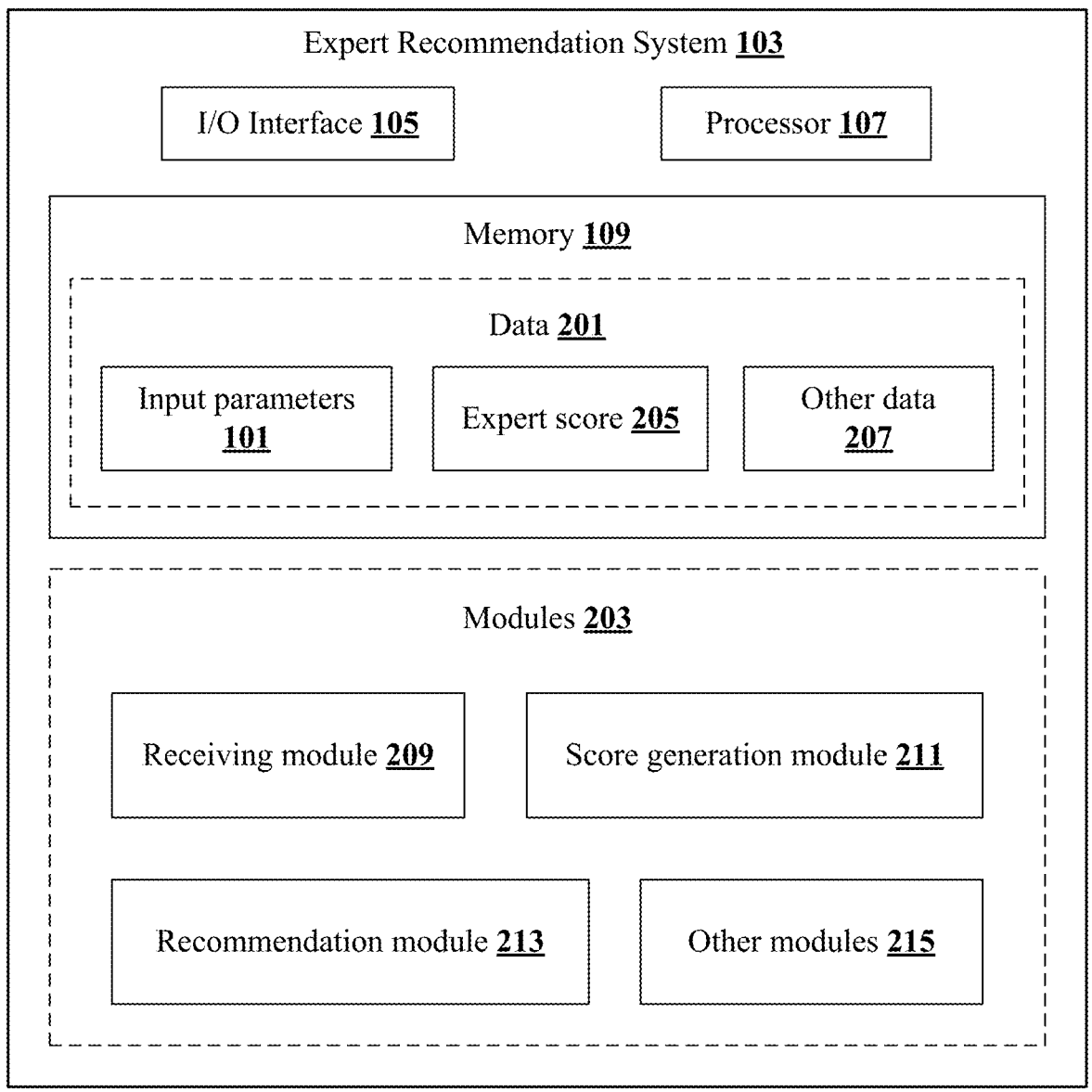
FIG. 2 shows a detailed block diagram illustrating an expert recommendation system for dynamic recommendation of experts in accordance with some embodiments of the present disclosure.

FIG. 2 shows a detailed block diagram illustrating an expert recommendation system 103 for dynamic recommendation of experts in accordance with some embodiments of the present disclosure.

The expert recommendation system 103 comprises an I/O interface 105, a processor 107 the memory 109. The I/O interface 105 may be configured to receive the one or more queries from the user. The memory 109 may be communicatively coupled to the processor 107. The processor 107 may be configured to perform one or more functions of the expert recommendation system 103 for dynamic recommendation of experts for resolving the one or user queries. In one implementation, the expert recommendation system 103 comprises data 201 and modules 203 for performing various operations in accordance with the embodiments of the present disclosure. In an embodiment, the data 201 may be stored within the memory 109 and may include, without limiting to, one or more input parameters 101, the expert score 205 for each of the one or more experts and other data 207.

In one embodiment, the data 201 may be stored within the memory 109 in the form of various data structures. Additionally, the aforementioned data 201 may be organized using data models, such as relational or hierarchical data models. The other data 207 may store data, including temporary data and temporary files, generated by modules 203 for performing the various functions of the expert recommendation system 103.

In some embodiment, the one or more input parameters 101 are the parameters associated with the one or more experts, that are required for generating the expert score 205 for each of the one or more experts. The values of each of the one or more input parameters 101 are computed based on inputs received from the user and the conversation logs 106 of the communication session between the user and the recommended expert. As an example, the one or more input parameters 101 may include, without limiting to, user ratings for the one or more available experts, time taken by the one or more available experts for resolving queries in the domain category previously, total number of queries resolved by the one or more experts in the domain category and prior experience of the one or more available experts.

In some embodiment, the user ratings for the one or more available experts may be collected from the user upon completion of the communication session. The user ratings may be assigned on a scale of 1 to 5, wherein a user rating of value '1' may indicate that the user is not satisfied with the solutions provided by the recommended expert. Alternatively, a user rating of value '5' may indicate that the user is completely satisfied with the solutions provided by the recommended expert. Similarly, the user ratings of value 2, 3 and 4 may indicate intermediate levels of user satisfaction for the solutions provided by the recommended expert. In an embodiment, the time taken by the one or more available experts in resolving the one or more queries is the total resolution time or the total time of conversation between the user and the expert during the communication session.

In some embodiment, the expert score 205 is a unique score assigned to each of the one or more experts based on the one or more input parameters 101. The expert having a highest expert score 205 may be recommended for resolving the one or more queries. The expert scores 205 computed by the expert recommendation system 103 may be treated as a true measure of expertise of the one or more experts for handling a particular category of the one or more queries.

In some embodiment, the data 201 may be processed by one or more modules 203 of the expert recommendation system 103. In one implementation, the one or more modules 203 may be stored as a part of the processor 107. In another implementation, the one or more modules 203 may be communicatively coupled to the processor 107 for performing one or more functions of the expert recommendation system 103. The modules 203 may include, without limiting to, a receiving module 209, a score generation module 211, a recommendation module 213 and other modules 215.

As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. In an embodiment, the other modules 215 may be used to perform various miscellaneous functionalities of the expert recommendation system 103. It will be appreciated that such aforementioned modules 203 may be represented as a single module or a combination of different modules.

The receiving module 209 is responsible for receiving one or more queries from the user through the I/O interface 105. In some embodiment, a machine learning component (not shown in figures) configured in the receiving module 209 may perform one or more machine learning techniques on the one or more received queries for analyzing and determining the domain category of each of the one or more received queries. As an example, the one or more machine learning techniques performed on the one or more queries may include, without limiting to, user query analysis, entity recognition and user intent mining.

In some embodiment, the user query analysis technique may be performed to identify the type of the one or more queries received from the user. As an example, the type of the one or more queries may be informational, closed, open, directed, undirected, navigational, transactional and so forth.

In an embodiment, the entity recognition technique may be performed to identify the domain category of the one or more queries.

In an embodiment, the user intent mining of the one or more queries may help in understanding the intent of the user by recognizing and extracting one or more important keywords from the one or more queries.

The information collected by performing the one or more machine learning techniques on the one or more queries are used for predicting appropriate responses to the one or more user queries.

In an embodiment, the score generation module 211 may be used to compute the expert score 205 for each of the one or more experts associated with the expert recommendation system 103. The expert score 205 may be computed based on the values of the one or more input parameters 101 and availability of the one or more experts. The score generation module 211 may retrieve the values of the one or more input parameters 101 using predetermined functions listed below:

a. getUserRating ( ): The 'getUserRating ( )' function may be used to retrieve the values of user ratings for each of the one or more experts in a specific domain category from the most recent conversation logs 106 stored in the expert recommendation system 103.

b. computeResolutionTime ( ): 'The computeResolutionTime ( )' function may be used to retrieve the total resolution time. In an embodiment, the total resolution time may be computed as the difference between the start and the end of the communication session between the user and the recommended expert in a specific domain category.

c. getNumberoftickets ( ): The 'getNumberoftickets ( )' function may be used to retrieve the total number of tickets resolved by the one or more experts in the specific domain category.

d. getCategory ( ): The 'getCategory ( )' function may be used to predict the domain category to which the one or more queries belong. In an embodiment, the domain category of the one or more queries may be determined based on the information collected by the machine learning component in the receiving module 209.

e. getExpertExp ( ): The 'getExpertExp ( )' function may be used to retrieve the number of years of experience of the one or more experts in resolving the one or more queries.

In an embodiment, the expert score 205 for each of the one or more experts may be generated based on the values of the one or more input parameters 101. Further, a dynamic list of experts 102 may be created based on the updated expert score 205 of each of the one or more experts. The expert scores 205 for each of the one or more experts in a specific domain category may be calculated using a method which includes, but not limited to, 'Metric of Expertise' as indicated in equation (1) shown below.

$$Sc = \left(T * \left(\frac{AUR}{S}\right)\right) * \frac{N}{Y} \quad (1)$$

Where,
'S' indicates the expert score 205 for an expert in a specific domain category 'c';
'T' indicates the throughput of the expert i.e., the rate at which the expert can resolve the one or more queries. The value of the throughput of the expert may be computed using equation (2) shown below:

$$T = \frac{N}{ART} \quad (2)$$

where, 'ART' indicates the Average Response Time taken by the expert to resolve 'N' number of tickets/queries in a specific domain category. The value of ART may be computed using equation (3) below:

$$ARTc, e = \sum \frac{ti}{TT}, (i \to 1 \text{ to } n) \quad (4)$$

where, T indicates the average time taken by the expert in the domain category 'c'; and
'TT' indicates the total time taken by all the experts in the domain category 'c'.
'AUR' indicates Average User rating for the expert in the domain category 'c'. The value of the AUR may be computed using equation (4) shown below:

$$AURc, e = \sum \frac{fi}{N} \quad (3)$$

where, 'f' indicates the user rating for the expert in the category 'c' per 'N' number of tickets/queries resolved by the expert.

'Y' indicates the number of years of experience of the expert in resolving the one or more user queries.

In an embodiment, initially, each of the one or more experts may be assigned with an expert score 205 of value '1'. Later, the score generation module 211 evaluates and generates the updated expert score 205 for each of the one or more experts based on the conversation logs 106 related to a previous communication between the user and the expert. Further, the score generation module 211 generates the dynamic list of experts 102 for indicating the updated expert scores 205 upon generating the expert score 205 for each of the one or more experts. In an embodiment, the dynamic list of experts 102 may be sorted in a predetermined order based on the expert score 205 for each of the one or more experts. As an example, the dynamic list of experts 102 may be sorted in an ascending order of the expert score 205, thereby indicating an expert having highest expert score 205 on top of the dynamic list of experts 102.

In an embodiment, the recommendation module 213 may be responsible for recommending the one or more experts for resolving the one or more queries received from the user. The recommendation module 213 uses dynamic list of experts 102 along with availability matrix 104 of the one or more experts for identifying the most appropriate expert having highest expert score 205 and who is available for setting up a communication session with the user. As an example, the availability matrix 104 of the one or more experts may indicate the availability status of the one or more experts as 'offline' or 'online'. If the availability status of an expert is 'offline', it means that the expert is either currently involved in resolving the one or more queries from a first user or the expert is currently unavailable for resolving the one or more queries. Similarly, if the availability status of the expert is 'online', it means that the expert is available for resolving the one or more queries from the user.

In an embodiment, the recommendation module 213 compares the availability matrix 104 of the one or more experts with the dynamic list of experts 102 for identifying the most appropriate expert for resolving the one or more queries. However, if an expert, having the highest expert score 205 is currently not available for handling the one or more queries, the expert recommendation system 103 dynamically identifies an alternative expert in the dynamic list of experts 102 who is next most appropriate for resolving the one or more queries. Thus, the recommendation module 213 provides seamless assistance to the users, by identifying and recommending an expert for resolving the one or more queries, even when few of the one or more experts are involved in resolving the one or more queries of the one or more other users.

Exemplary Embodiment

Consider an automated response-request environment 100 which comprises five experts, namely expert E1, expert E2, expert E3, expert E4 and expert E5 who have varied level of expertise in one or more domain categories, namely domain category C1, domain category C2, domain category C3 and domain category C4. Now, an expert score 205 for each of the one or more experts (expert E1-expert E5) may be generated using the equation (1) explained in the above description. In an embodiment, the expert score 205 for each of the one or more experts may be generated by substituting the values of the one or more input parameters 101, comprising the total resolution time, the user ratings for the one or more experts, the number of tickets resolved by the one or more experts in a domain category and the total number of years of experience of the expert in the equation (1).

Accordingly, the tickets handled by each of the one or more experts for resolving the one or more queries belonging to the one or more domain categories may be indicated as shown in FIG. 6A. For example, the expert E1 may have solved 10 tickets belonging to domain category C1, the expert E2 may have solved a single ticket in the domain category C2 and the expert E3 may have solved 12 tickets in the domain category C4. FIG. 6A also indicates the total number of tickets solved in each of the one or more domain categories by each of the experts E1-E5.

Similarly, the User Rating (UR), on a scale of 1-5, provided to each of the one or more experts upon resolving the one or more queries of the user may be as indicated in FIG. 6B. Where, the value '5' indicates the highest UR and the value '1' indicates the lowest UR. For example, the user rating provided to the expert E1 in the domain category C2 may be '2'. Whereas, the user rating for the expert E2 in the domain category C2 may be '4.7', which means that the expert E2 is the better expert for handling the one or more queries belonging to the domain category C2, when compared to the expert E1.

Further, the Resolution Time (RT) taken by each of the one or more experts (in minutes) for resolving the one or more queries may be as indicated in the FIG. 6C. For example, the time taken by the expert E1 for resolving the one or more queries in the domain category C1 may be 3 minutes. Similarly, the time taken by the expert E3 for resolving the one or more queries in the domain category C1 may be 4 minutes The total number of years of experience of each of the one or more experts may be as indicated in FIG. 6D. As an example, the expert E4 may have 4 years of experience in the handling the one or more queries in the one or more domain categories.

Now, the throughput (T) of each of the one or more experts while resolving the one or more queries of one or more domain categories may be calculated using the equation (2) explained earlier.

$$\text{i.e., } T = \frac{N}{ART}$$

Accordingly, upon substituting the values of the one or more input parameters 101 in the equation (2), the throughput of each of the one or more experts may be as indicated in FIG. 6E. For example, the throughput of the expert E2 in the domain category C1 may be 3. Here, the throughput of the expert E2 may be determined based on the total number of tickets handled by the expert E2 and the ART for the expert E2 in the domain category C1.

$$\text{i.e., Throughput of the expert } E2 \text{ in domain category } C1 = \frac{\text{Total number of tickets handled by the expert } E2}{ART \text{ for the expert } E2 \text{ in domain category } C1} = 6/2 = 3$$

Similarly, the Average User Rating (AUR) for each of the one or more experts may be computed by substituting the values of the one or more input parameters 101 in the equation (3) above.

$$\text{i.e., } AURc, e = \sum \frac{fi}{N}$$

Accordingly, upon substituting the values of the one or more input parameters 101 in the equation (3), normalizing the values, the AUR for each of the one or more experts may be as indicated in FIG. 6F. For example, the AUR for the expert E1 in the domain category C1 may be 0.48. Here, the AUR for the expert E1 may be computed based on the user rating for the expert in the domain category C1 and the total number of tickets handled by the expert E1 in domain category C1.

$$\text{i.e., The } AUR \text{ for expert } E1 \text{ in domain category } C1 := $$

$$\frac{\text{User rating for expert } E1 \text{ in domain category } C1}{\text{Total number of tickets handled by expert } E1 \text{ in domain category } C1} = $$

$$0.24 * 2 * (\text{normalization constant} \sim 2) = 0.48$$

Further, the Average Resolution Time (ART) for each of the one or more experts may be computed by substituting the values of the one or more input parameters 101 in the equation (4) above.

$$\text{i.e., } ARTc, e = \sum \frac{ti}{TT}, (i \to 1 \text{ to } n)$$

Accordingly, upon substituting the values of the one or more input parameters 101 in the equation (4) the ART for each of the one or more experts may be as indicated in FIG. 6G. For example, ART for the expert E1 for the domain category C1 may be 3 minutes, and ART for the expert E2 in the domain category may be 1 minute.

Finally, the expert score (S) for each of the one or more experts may be computed by substituting the values of the one or more input parameters 101 in the equation (1) explained earlier.

$$\text{i.e., } Sc = \left(T * \left(\frac{AUR}{S}\right)\right) * \frac{N}{Y}$$

Accordingly, upon substituting the values of the one or more input parameters 101 in the equation (1) and normalizing the values with a normalization factor of '5', the expert scores 205 for each of the one or more experts in the one or more domain categories may be as indicated in FIG. 6H. For example, the expert score for the expert E1 in the domain category C1 may be generated based on the throughput and the AUR for the expert E1 and the total number of tickets solved by the expert E1 in the domain category C1.

i.e., Expert score for expert $E1$ for domain category $C1 = $ $$3.33 * 0.48 * (10/2.3) = 6.95$$

Similarly, expert score for expert $E2$ in domain category $C1 = $ $$3 * 0.7 * (6/4) = 3.15$$

A sorted list of the one or more experts may be generated by sorting the one or more experts based on the expert score 205 of each of the one or more experts in the one or more domain categories. As an example, according to Table H, the sorted list of the one or more experts based on the expert score 205 for the category C2 may be as indicated below.

E=[E5, E4, E3, E1, E2]

Furthermore, the availability of each of the one or more experts is considered for identifying the most appropriate expert for resolving the one or more queries based on the sorted list of the one or more experts. As an example, the availability matrix 104 for the one or more experts may be as indicated below:

A=[1, 0, 1, 1, 0] for E=[E5, E4, E3, E1, E2]

Where, 'A' denotes the availability matrix 104 for the one or more experts E1-E5. Where, a value '0' indicates that the expert is 'offline' or is involved in resolving the one or more other queries. Similarly, a value '1' indicates that the expert is 'online' and is available for resolving the one or more queries.

Finally, the expert recommendation system 103 may identify the one or more experts for recommending by comparing the sorted list of the one or more experts with the availability matrix 104 of the one or more experts. Hence, by comparing the above lists (E and A), the one or more available experts that are most appropriate for handling the one or more queries belonging to domain category 'C2' are—expert E5, expert E3 and expert E1.

$$\text{i.e., } AXE = [1, 0, 1, 1, 0] \times [E5, E4, E3, E1, E2]$$
$$= [E5, E3 \text{ and } E1]$$

Figure 3:
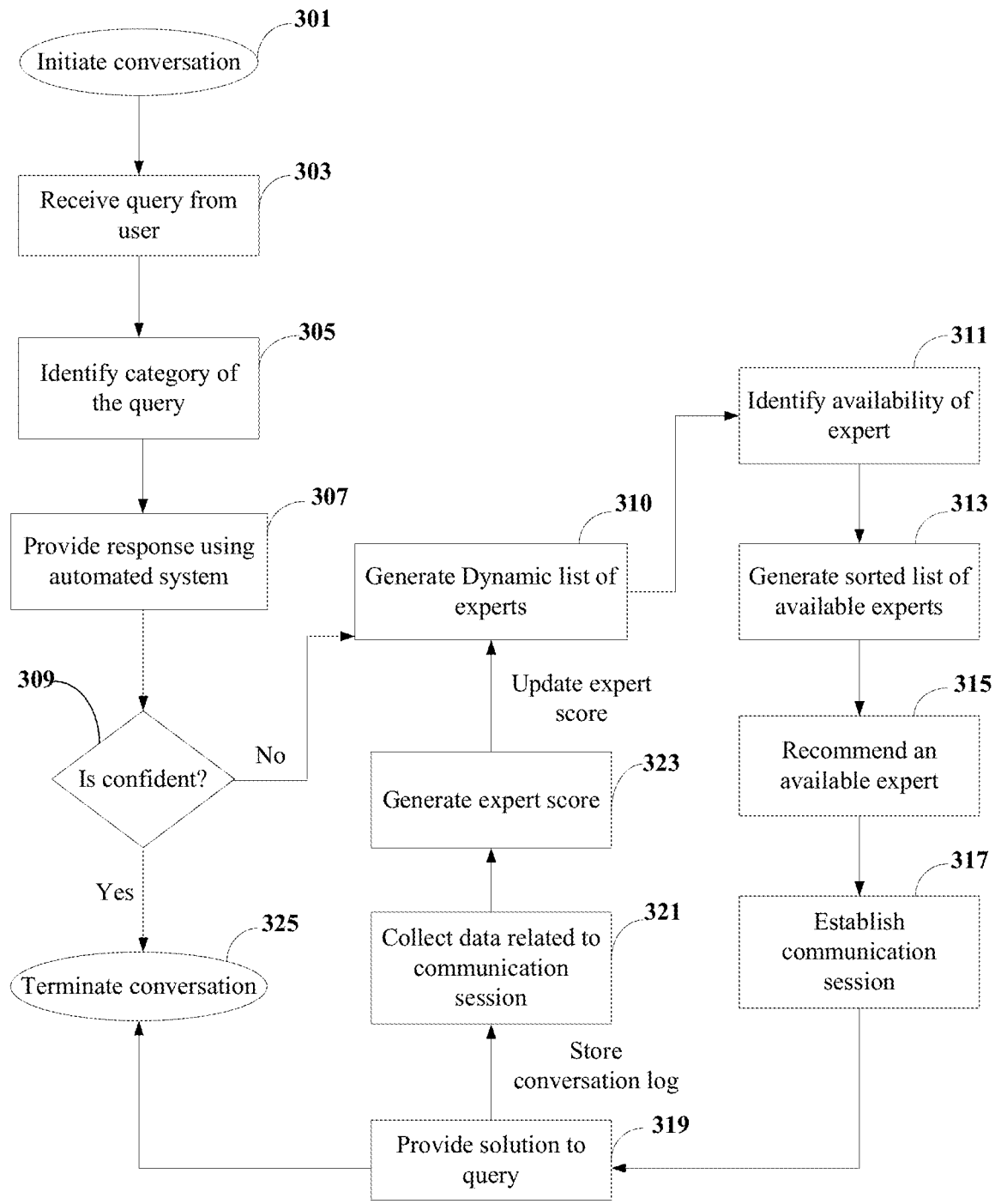
FIG. 3 shows a flowchart illustrating a method for evaluating an expert in accordance with few embodiments of the present disclosure.

FIG. 3 shows a flowchart illustrating a method for evaluating an expert in accordance with few embodiments of the present disclosure. Accordingly, at step 301, a conversation between the user and the expert recommendation system 103 is initiated. At step 303, the expert recommendation system 103 receives one or more queries from the user. At 305, the domain category of each of the one or more received queries are identified, in an embodiment, using the machine learning component configured in the receiving module 209 of the expert recommendation system 103. Upon identifying the domain category of each of the one or more queries, at step 307, the expert recommendation system 103 may provide one or more automated responses to the one or more queries using one or more domain specific, predetermined answers/responses stored in the expert recommendation system 103. At step 309, the expert recommendation system 103 checks whether the user is satisfied by the one or more automated responses provided in response to the one or more queries. The confidence score, which is a measure of the user's satisfaction with the one or more automated responses, is calculated by capturing the intent of the user, using the machine learning component. In an embodiment, if the confidence score associated with the one or more automated responses is higher than a threshold value, it means that the user is satisfied by the one or more automated responses provided to him and the one or more queries are resolved. Eventually, at step 325, the conversation between the user and the expert recommendation system 103 is terminated.

Alternatively, if the confidence score is less than the threshold value, then the expert recommendation system 103 may recommend the one or more experts for resolving the one or more queries of the user. Hence, at step 310, the expert recommendation system 103 generates a dynamic list of experts 102 associated with the expert recommendation system 103. The dynamic list of experts 102 may be generated based on the one or more initial expert scores 205 assigned to each of the one or more experts. At step 311, the expert recommendation system 103 generates an availability matrix 104 of the one or more experts by identifying the one or more available experts among the one or more experts listed in the dynamic list of experts 102. At step 313, the expert recommendation system 103 compares the dynamic list of experts 102 with the availability matrix 104 to generate a sorted list of all the available experts based on the expert scores 205 assigned to each of the one or more experts. At step 315, the expert recommendation system 103 recommends one of the one or more available experts from the sorted list of all the available experts for resolving the one or more queries.

At step 317, a communication session is established between the user and the recommended expert for initiating a conversation between the user and the recommended expert for resolving the one or more queries as shown in step 319. The conversation log 106 of the entire communication session may be stored in the expert recommendation system 103 for future analysis purposes. At step 321, the expert recommendation system 103 collects information related to the communication session for generating an updated expert score 205 for the recommended expert, as indicated at step 323. As an example, the one or more information collected during the communication session may include, without limiting to, total resolution time, total number of tickets raised and/or handled by the recommended expert, user rating for the recommended expert and so forth. Finally, the expert recommendation system 103 dynamically generates an updated list of experts based on the updated expert scores 205.

Figure 4:
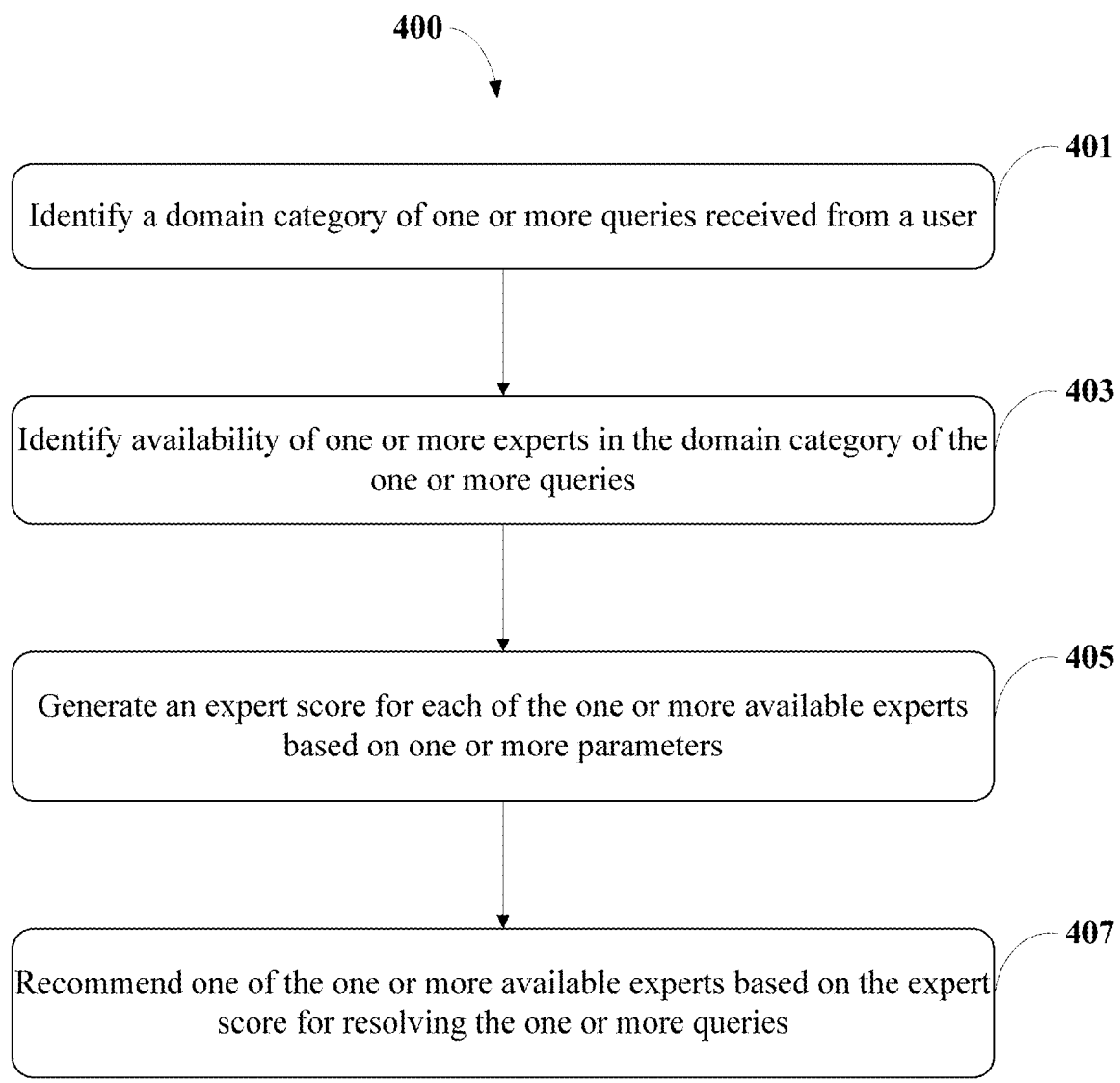
FIG. 4 shows a flowchart illustrating a method for dynamic recommendation of experts in accordance with some embodiments of the present disclosure.

FIG. 4 shows a flowchart illustrating a method for dynamic recommendation of experts in accordance with some embodiments of the present disclosure.

As illustrated in FIG. 4, the method 400 comprises one or more blocks for dynamic recommendation of experts for resolving queries using an expert recommendation system 103. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 401, the expert recommendation system 103 identifies a domain category of one or more queries received from a user.

At block 403, the expert recommendation system 103 identifies availability of one or more experts in the domain category of the one or more queries for resolving the one or more queries received from the user.

At block 405, the expert recommendation system 103 generates an expert score 205 for each of the one or more available experts based on one or more input parameters 101 comprising user ratings for the one or more available experts, time taken by the one or more available experts to resolve queries in the domain category previously, total number of queries resolved by the one or more experts in the domain category and prior experience of the one or more available experts, wherein the expert score 205 for each of the one or more available experts is dynamically updated.

At block 407, the expert recommendation system 103 recommends one of the one or more available experts based on the expert score 205 for resolving the one or more queries. The one or more available experts having highest expert score 205 are recommended for resolving the one or more queries. In an embodiment, a real-time communication session is established between the user and the recommended expert to resolve the one or more queries. Further, the one or more input parameters 101 corresponding to the recommended expert are updated upon completion of the real-time communication session. In an embodiment, the expert score 205 for the recommended expert is dynamically updated based on update of the one or more input parameters 101.

Computer System

Figure 5:
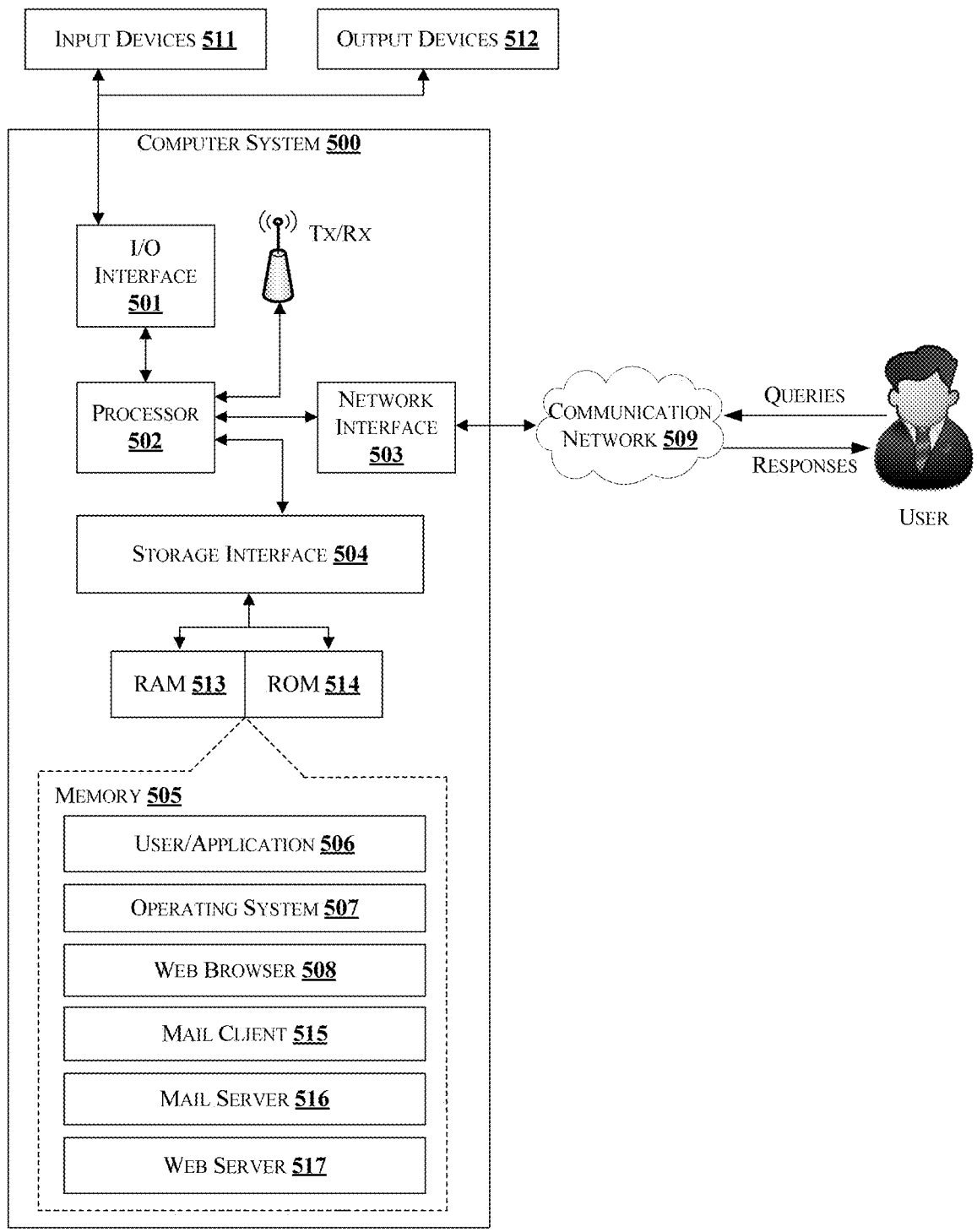
FIG. 5 illustrates a block diagram of an exemplary computer system for implementing embodiments consistent with the present disclosure.

FIG. 5 illustrates a block diagram of an exemplary computer system 500 for implementing embodiments consistent with the present invention. In an embodiment, the computer system 500 may be the expert recommendation system 103 which is used for dynamic recommendation of experts for resolving queries. The computer system 500 may comprise a central processing unit ("CPU" or "processor") 502. The processor 502 may comprise at least one data processor for executing program components for executing user- or system-generated business processes. A user may include a person, a person using a device such as such as those included in this invention, or such a device itself. The processor 502 may include specialized processing units such as integrated system (bus) controllers, memory management control units, floating point units, graphics processing units, digital signal processing units, etc.

The processor 502 may be disposed in communication with one or more input/output (I/O) devices (511 and 512) via I/O interface 501. The I/O interface 501 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc.

Using the I/O interface 501, the computer system 500 may communicate with one or more I/O devices (511 and 512).

In some embodiments, the processor 502 may be disposed in communication with a communication network 509 via a network interface 503. The network interface 503 may communicate with the communication network 509. The network interface 503 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 503 and the communication network 509, the computer system 500 may communicate with the user for receiving the one or more queries from the user and to provide response to the one or more user queries. The communication network 509 can be implemented as one of the different types of networks, such as intranet or Local Area Network (LAN) and such within the organization. The communication network 509 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 509 may include a variety of network devices, including routers, bridges, servers, computing devices, storage devices, etc.

In some embodiments, the processor 502 may be disposed in communication with a memory 505 (e.g., RAM 513, ROM 514, etc. as shown in FIG. 5) via a storage interface 504. The storage interface 504 may connect to memory 505 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user/application data 506, an operating system 507, web server 508 etc. In some embodiments, computer system 500 may store user/application data 506, such as the data, variables, records, etc. as described in this invention. Such databases may be implemented as fault-tolerant, relational, scalable, secure databases such as Oracle or Sybase.

The operating system 507 may facilitate resource management and operation of the computer system 500. Examples of operating systems include, without limitation, Apple Macintosh OS X, UNIX, Unix-like system distributions (e.g., Berkeley Software Distribution (BSD), FreeBSD, Net BSD, Open BSD, etc.), Linux distributions (e.g., Red Hat, Ubuntu, K-Ubuntu, etc.), International Business Machines (IBM) OS/2, Microsoft Windows (XP, Vista/7/8, etc.), Apple iOS, Google Android, Blackberry Operating System (OS), or the like. A user interface may facilitate display, execution, interaction, manipulation, or operation of program components through textual or graphical facilities. For example, user interfaces may provide computer interaction interface elements on a display system operatively connected to the computer system 500, such as cursors, icons, check boxes, menus, windows, widgets, etc. Graphical User Interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, JavaScript, AJAX, HTML, Adobe Flash, etc.), or the like.

In some embodiments, the computer system 500 may implement a web browser 508 stored program component. The web browser may be a hypertext viewing application, such as Microsoft Internet Explorer, Google Chrome, Mozilla Firefox, Apple Safari, etc. Secure web browsing may be provided using Secure Hypertext Transport Protocol (HTTPS) secure sockets layer (SSL), Transport Layer Security (TLS), etc. Web browsers may utilize facilities such as AJAX, DHTML, Adobe Flash, JavaScript, Java, Application Programming Interfaces (APIs), etc. In some embodiments, the computer system 500 may implement a mail server stored program component. The mail server may be an Internet mail server such as Microsoft Exchange, or the like. The mail server may utilize facilities such as Active Server Pages (ASP), ActiveX, American National Standards Institute (ANSI) C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 500 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the embodiment of the present disclosure are illustrated herein.

In an embodiment, the present disclosure provides a method for dynamically recommending experts for resolving one or more queries of a user based on the availability and expert score associated with the available experts.

In an embodiment, the expert recommendation system of present disclosure helps in reducing total number of service tickets being generated for resolving the one or more queries received from the user.

In an embodiment, the expert recommendation system of present disclosure provides immediate resolution for the one or more user queries, thereby reducing the total waiting time for the user.

In an embodiment, the method of present disclosure generates quality content and facilitates in active learning and evaluation of the one or more experts in real-time.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise. A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for dynamic recommendation of experts for resolving queries, the method comprising:
   identifying, by an expert recommendation device, a domain category ('C') of one or more queries received from a user;
   identifying, by the expert recommendation device, availability of one or more experts in the domain category ('C') of the one or more queries;
   generating, by the expert recommendation device, an expert score ('Sc') for each of the one or more available experts based on one or more parameters comprising user ratings ('AUR') for the one or more available experts, average time ('t') taken by the one or more available experts for resolving queries in the domain category ('C') previously and total time ('TT') taken by all the experts in the domain category ('C'), total number ('N') of queries resolved by the one or more experts in the domain category ('C') and prior experience ('Y') of the one or more available experts, wherein the expert score for each of the one or more available experts is dynamically updated based on an update in the one or more parameters, and wherein generating the expert score using below equation:

$$Sc = \left( \frac{N}{\sum \frac{ti}{TT}} * \left( \frac{AUR}{5} \right) \right) * \frac{N}{Y};$$

and
   recommending, by the expert recommendation device, one of the one or more available experts based on the expert score for resolving the one or more queries.

2. The method as claimed in claim 1, wherein the one of the one or more available experts having highest expert score is recommended for resolving the one or more queries.

3. The method as claimed in claim 1 further comprises establishing a real-time communication session between the user and the recommended expert for resolving the one or more queries.

4. The method as claimed in claim 3, wherein the one or more parameters corresponding to the recommended expert are updated upon completion of the real-time communication session.

5. An expert recommendation device for comprising:
   a processor; and
   a memory communicatively coupled to the processor, wherein the memory stores processor-executable instructions, which, on execution, causes the processor to:
   identify a domain category ('C') of one or more queries received from a user;
   identify availability of one or more experts in the domain category ('C') of the one or more queries;
   generate an expert score ('Sc') for each of the one or more available experts based on one or more parameters comprising user ratings ('AUR') for the one or more available experts, average time ('t') taken by the one or more available experts for resolving queries in the domain category ('C') previously and total time ('TT') taken by all the experts in the domain category ('C'), total number ('N') of queries resolved by the one or more experts in the domain category ('C') and prior experience ('Y') of the one or more available experts, wherein the expert score for each of the one or more available experts is dynamically updated based on an update in the one or more parameters, and wherein generating the expert score using below equation:

$$Sc = \left( \frac{N}{\sum \frac{ti}{TT}} * \left( \frac{AUR}{5} \right) \right) * \frac{N}{Y};$$

and
   recommend one of the one or more available experts based on the expert score for resolving the one or more queries.

6. The expert recommendation device as claimed in claim 5, wherein the processor recommends the one of the one or more available experts having highest expert score to resolve the one or more queries.

7. The expert recommendation device as claimed in claim 5, wherein the processor establishes a real-time communication session between the user and the recommended expert to resolve the one or more queries.

8. The expert recommendation device as claimed in claim 7, wherein the processor updates the one or more parameters corresponding to the recommended expert upon completion of the real-time communication session.

9. A non-transitory computer readable medium including instructions stored thereon that when processed by at least one processor causes an expert recommendation device to perform operations comprising:
   identifying a domain category ('C') of one or more queries received from a user;
   identifying availability of one or more experts in the domain category ('C') of the one or more queries;
   generating an expert score for each of the one or more available experts based on one or more parameters comprising user ratings for the one or more available experts, average time ('t') taken by the one or more available experts for resolving queries in the domain category ('C') previously and total time ('TT') taken by all the experts in the domain category ('C'), total number of queries resolved by the one or more experts in the domain category ('C') and prior experience of the one or more available experts, wherein the expert score for each of the one or more available experts is dynamically updated based on an update in the one or more parameters, and wherein generating the expert score using below equation:

$$Sc = \left( \frac{N}{\sum \frac{ti}{TT}} * \left( \frac{AUR}{5} \right) \right) * \frac{N}{Y};$$

and recommending one of the one or more available experts based on the expert score for resolving the one or more queries.

* * * * *